Figure 1:
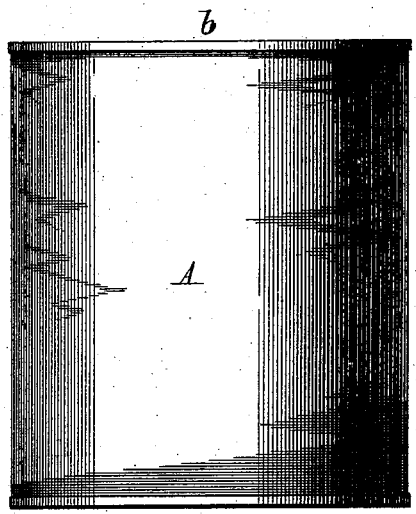

(No Model.)

W. H. EDMUNDS.
HERMETICALLY SEALED CAN.

No. 523,764. Patented July 31, 1894.

Witnesses
W. J. Norton
John W. Dudley.

Inventor
William H. Edmunds
By W. W. Dudley & Co.
his Attorneys

UNITED STATES PATENT OFFICE.

WILLIAM H. EDMUNDS, OF WASHINGTON, DISTRICT OF COLUMBIA.

HERMETICALLY-SEALED CAN.

SPECIFICATION forming part of Letters Patent No. 523,764, dated July 31, 1894.

Application filed November 11, 1893. Serial No. 490,666. (No model.)

*To all whom it may concern:*

Be it known that I, WILLIAM H. EDMUNDS, a citizen of the United States, residing at Washington, in the District of Columbia, have invented certain new and useful Improvements in Hermetically-Sealed Cans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to hermetically sealed cans of that class in which the sealing is effected by soldering the separable parts together, and which have a wire so located with relation to the said parts and the solder, as that the latter becomes broken when a pulling action is exerted on the wire, and the parts are susceptible of disconnection. In this class of invention repeated attempts have been made to prevent the entrance of the solder into the interior of the can during the sealing operation in order to avoid contact with the contents, and also to prevent the soldering of the parts at any place or places other than that intended; it being obvious that if the solder lodges beyond the point at which it could be broken by the wire, the separation of the parts could not be effected without a mutilation of the can.

It is an object of my invention to provide a can for the preserving of meats, fruits, vegetables, and the like, in which the parts are assembled and the joints tightly sealed from the air and moisture, with a minimum of time and labor, and in which provision is made for preventing the entrance of solder into the interior of the can, and to any point, other than that originally intended, where a joint could be made between the separable parts.

It is also an object of my invention to provide a can of this class with a closure which may cover an opening of comparatively small diameter where the contents are of a more or less liquid nature, or which may cover an opening of comparatively large diameter where the contents are of a more or less solid nature, it being understood that the said closure or cover may be made any desired size to close the opening required for the removal of the contents; also my invention contemplates a simple and efficient can of this character possessing advantages in point of inexpensiveness and durability, and accessibility to the contents.

To these ends my invention consists in the construction, relative arrangement, and operation of the several parts, all of which will hereinafter fully and clearly appear from a reading of the following description taken in connection with the accompanying drawings, which form a part of this specification, and in which—

Figure 2:
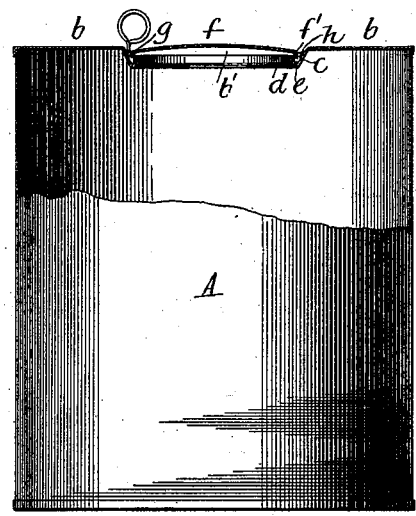
Figure 3:
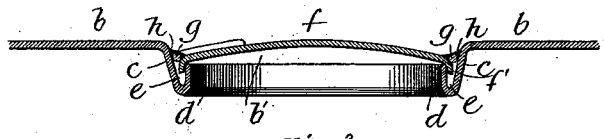

Figure 1. illustrates in side elevation, a can embodying my improvement. Fig. 2. is a vertical central section of the same. Fig. 3. is an enlarged sectional view of the top of said can.

Like letters of reference denote like parts in the several figures of the drawings.

The letter A. denotes the can which is preferably cylindrical in shape but which may be tapered toward the bottom or top, or made in any other desired shape, and $b$ is the top thereof which is provided with an opening $b'$ through which the contents may be inserted and removed. The sides $c$ of said opening are tapered as shown and are provided with a return bend or flange $d$ whereby is formed an annular pocket or depression $e$.

$f$ is the top of the cap which is preferably convex in shape and which when in position lies flush with or slightly below the top $b$. The rim $f'$ of this cap enters the pocket for a short distance and contacts with the flange $d$ fitting same closely, and rests on or is supported by the top of said flange. The rim $f'$ however does not contact with the sides $c$ of the opening, as I desire a clear space at this point as well as a space below the rim $f'$ for a purpose to be presently explained.

$g$ is the wire employed in connection with the seal which is bent to conform to the seat formed by the rim $f'$ and the sides $c$ and which in practice is forced into said seat and held temporarily by the wedging action of the two incline surfaces. One end $g'$ of this wire extends beyond said seat and is formed into a ring or similar device for the purpose of easy manipulation, and to obviate the necessity of a separate key, or a pair of pinchers. In practice the wire entirely closes the entrance to the joint, but in the event of any solder passing the same it runs down between the sides c and the rim f' and lodges in the pocket, free from any sealing effect. The solder h fills the spaces at each side of the wire, and forms with the latter a very tight seal excluding all air and moisture.

When the parts are to be disconnected, i. e., the can is to be opened, a slight pull on the wire tends to break the solder and the cover is removed intact and can be replaced if desired to preserve the remaining contents. By reason of the pocket e and the passage thereto between the sides and the rim, the sealing is made at only the point where it may be broken, and thus the necessity of employing packing to prevent the entrance of the solder and the sealing of the can and cap or cover directly, is obviated.

The wire serves not only for disconnecting the separable parts, but assists the solder in making the seal, and thus economy in the use of solder is had, and as most of the solder is removed with the wire it may be recovered and used again.

An important feature of my invention is that both the can proper, and the cap after being disconnected, are intact and can be used for household purposes, or can be used again for preserving.

The joint as made allows sufficient play for the expansion of the can due to the gas generated by the contents, and will also permit of the can being handled roughly without causing the seal to become impaired.

By my invention I am enabled to produce a can of the character aforesaid, which is neat and compact, is durable and efficient, and susceptible of being sealed hermetically tight, and by reason of the peculiar method of sealing employed, the wire may be easily and quickly manipulated to break the solder, and the can opened with facility.

I claim—

A can having its opening end formed with a depending flange having a return bend and a pocket formed thereby, a closure having a depending flange which enters said pocket and fits closely said return bend leaving a passage between the said flanges, and a wire closing said passage and soldered in place, substantially as described.

In testimony whereof I affix my signature in presence of two witnesses.

WILLIAM H. EDMUNDS.

Witnesses:
WILL. T. NORTON,
F. L. BROWNE.